United States Patent
Rabaeijs et al.

[11] Patent Number: 6,038,248
[45] Date of Patent: Mar. 14, 2000

[54] METHOD AND APPARATUS FOR RECEIVING AND CONVERTING SPREAD SPECTRUM SIGNALS

[75] Inventors: Alain Rabaeijs, Aarschot; Bert Gyselinckx, Heverlee; Marc Engels, Wijgmaal, all of Belgium

[73] Assignee: Imec Vzw, Leuven, Belgium

[21] Appl. No.: 08/965,299

[22] Filed: Nov. 6, 1997

Related U.S. Application Data

[60] Provisional application No. 60/030,449, Nov. 6, 1996.

[30] Foreign Application Priority Data

Jan. 31, 1997 [EP] European Pat. Off. ............ 97870012

[51] Int. Cl.[7] ...................................................... H04B 1/69
[52] U.S. Cl. ........................................ 375/200; 375/316
[58] Field of Search .................................. 375/200, 316; 701/213, 214

[56] References Cited

U.S. PATENT DOCUMENTS

| | | | |
|---|---|---|---|
| 5,291,516 | 3/1994 | Dixon et al. | 375/200 |
| 5,796,772 | 8/1998 | Smith et al. | 375/200 |

FOREIGN PATENT DOCUMENTS

| | | |
|---|---|---|
| 0 523 938 A1 | 1/1993 | European Pat. Off. . |
| 5-274410 | 2/1993 | Japan . |

OTHER PUBLICATIONS

Brown, A., et al. (1994) Digital Downconversion test results with a broadband L–band GPS receiver. IEEE Digital Avionics Systems Conference. 13th DASC, Phoenix, AZ, Oct. 30–Nov.; Abstract pp. 426–431.

Riley, S., et al. (1995) A combined GPS/GLONASS high percision receiver for space applications. ION–GPS, Palm Springs.

Patent Abstract of Japan for application No. 05274410 in one page.

*Primary Examiner*—Stephen Chin
*Assistant Examiner*—Lenny Jiang
*Attorney, Agent, or Firm*—Knobbe, Martens, Olson & Bear, LLP

[57] ABSTRACT

A method and apparatus for receiving and converting spread spectrum signals is disclosed. The method and apparatus allow the receiving of spread spectrum signals and different frequency bands substantially simultaneously on the same chain of hardware components. The received signals are processed on the chain of hardware components and the resulting signal thereafter can further be used within an electronic circuit. The method includes the steps of converting analog signals into a lower frequency digital signal. The conversion step includes capturing a plurality of incoming signals within a predetermined spectral range, filtering out of the incoming signals a first plurality of analog spread spectrum signals in a plurality of analog spread spectrum signals in a plurality of predetermined bands with predetermined widths, and sampling the analog signals with a sampling frequency $F_s$ wherein $F_s$ is chosen such that the resulting time-discreet signal comprises a second plurality of analog spread spectrum signals, being the first plurality of analog spread spectrum signals which have been aliased without substantial self-aliasing.

10 Claims, 2 Drawing Sheets

METHOD AND APPARATUS FOR RECEIVING AND CONVERTING SPREAD SPECTRUM SIGNALS

This application claims benefit of provisional application Ser. No. 60/030,449, filed Nov. 6, 1996.

FIELD OF THE INVENTION

The present invention relates to an apparatus and method for receiving and converting spread spectrum signals. In particular the present invention relates to an apparatus and a method for receiving and processing spread spectrum signals simultaneously in different frequency bands.

BACKGROUND OF THE INVENTION

An increasing number of applications and systems for communicating information nowadays makes use of the spread spectrum technique. The spread spectrum technique is a digital modulation technique in which a digital signal is spread over a wide frequency band so that it has a noise-like spectrum. This is done by breaking up each data bit of the digital signal into multiple sub-bits (commonly called chips or Pseudo Noise (PN) code bits) that are then modulated and up-converted to a carrier frequency. By using orthogonal codes for different communication links, the same frequency band can be used for different simultaneous communication links. Using the same PN code as the transmitter, a receiver can correlate the received, spread signal and reconstruct the data signal, while other receivers that use other codes or other transmission techniques cannot. One of the advantages of using the spread spectrum communication technique is the robustness to narrow band interference signals. Because spread-spectrum receivers are rapidly introduced in applications and systems meant for the consumer markets, the cost of the receiver system is a major determining factor in order to remain competitive.

A specific class of spread spectrum systems are devices and receivers for position determination. Such devices are gaining importance for both the consumer market and for high precision applications. Most of the existing systems nowadays are based on the American Global Positioning System (GPS) system. Because this is a military system, precise position determination can be at any moment made impossible by the satellite operator via deliberately introducing errors. Moreover, in many areas the number of visible satellites can be too limited to determine an accurate position. These two problems can be reduced by also using a second positioning system such as the Russian Global Orbiting Navigation Satellite System (GLONASS) system.

Combined GPS and GLONASS receivers have been reported. S. Riley, N. Howard, E. Aardoom, R. Daly, and P. Silvestrin, in "A combined GPS/GLONASS high precision receiver for space applications", ION-GPS 95, Palm Springs, USA, September 1995, disclose a prototype multichannel combined GPS/GLONASS receiver capable of simultaneously tracking the Course Acquisition and Precision codes. This receiver separates the GPS and GLONASS signals on two different chains of hardware components, one chain for the GPS signals, one chain for the GLONASS signals. Japanese patent application, JP7128423-950519, "Receiver Common to GPS and GLONASS" discloses a device that receives both GPS and GLONASS signals. These signals are converted into first IF signals by an image reject mixer. The oscillation frequency of a local oscillator is set to be at the middle between the GPS carrier frequency and the GLONASS carrier frequency. This receiver separates the GPS and GLONASS signals on two different chains of hardware components, one chain for the GPS signals, one chain for the GLONASS signals. These prior-art implementations of combined GPS/GLONASS receivers are complicated and hence costly.

SUMMARY OF THE INVENTION

One aspect of the present invention is to disclose a method for receiving and converting spread spectrum signals. Said method allows to receive spread spectrum signals in different frequency bands substantially simultaneously on the same chain of hardware components. The received signals are processed on said chain of hardware components and the resulting signal thereafter can further be used within an electronic circuit.

Said method comprises the step of converting analog signals into a lower frequency digital signal. Said conversion step comprises the steps of capturing a plurality of incoming signals within a predetermined spectral range, filtering out of said incoming signals a first plurality of analog spread spectrum signals in a plurality of predetermined bands with predetermined bandwidths, and sampling said first plurality of analog signals with a sampling frequency fs wherein fs is chosen such that the resulting time-discrete signal comprises a second plurality of analog spread spectrum signals, being said first plurality of analog spread spectrum signals which have been aliased without substantial self-aliasing.

This method can further comprise the steps of digitizing said resulting time-discrete signal whereby defining a third plurality of digitized spread spectrum signals, and filtering one digitized signal out of said third plurality of digitized signals.

In another aspect of the present invention, the sampling frequency $f_s$ in the method of converting analog signals into a lower frequency digital signal is chosen to be the minimum sampling frequency yielding a resulting time-discrete signal that comprises a second plurality of analog spread spectrum signals, being said first plurality of analog spread spectrum signals which have been aliased without substantial self-aliasing.

Yet in another aspect of the present invention $f_s$, being chosen as the sampling frequency yielding a resulting time-discrete signal that comprises a second plurality of analog spread spectrum signals being said first plurality of analog spread spectrum signals being aliased without substantial self-aliasing, is further chosen such that the harmonic frequencies of $f_s$ are outside of said predetermined bands and such that $f_s$ is higher than or equal to the minimum sampling frequencies $f_{min}$ for each of said predetermined bandwidths. $f_{min}$ is defined as $f_{min}=(2*f1)/n$ with f1 being the lowest frequency of said predetermined bands and n=floor(f1/B), with B the bandwidth of said bands.

In a further aspect of the present invention, an apparatus for receiving spread spectrum signals substantially simultaneously in different frequency bands is disclosed. Said apparatus comprises means for capturing a plurality of incoming spread spectrum signals within a predetermined spectral range. The apparatus further comprises a chain of hardware components including a filter for filtering out of said incoming signals a first plurality of analog spread spectrum signals in a plurality of predetermined bands with predetermined bandwidths, and a sampling unit for sampling said analog signals with a sampling frequency $f_s$ wherein $f_s$ is chosen such that the resulting time-discrete signal comprises a second plurality of analog spread spectrum signals, being said first plurality of analog spread spectrum signals which have been aliased without substantial self-aliasing. The apparatus can further comprise means for digitizing said resulting time-discrete signal whereby defining a third plurality of digitized spread spectrum signals, and means for filtering one digitized signal out of said third plurality of digitized signals.

DETAILED DESCRIPTION OF THE INVENTION

Figure 1:
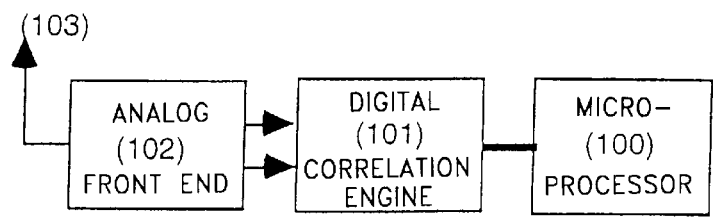
FIG. 1 shows the global structure of a combined GPS and GLONASS receiver according to an embodiment of the present invention. A chain of building blocks including an antenna (103), RF front end (102), digital correlation engine (101) and a microprocessor (100) are shown.

One aspect of the present invention is to disclose a method for receiving and converting spread spectrum signals. Said method allows to receive spread spectrum signals in different frequency bands substantially simultaneously on the same chain of hardware components. The received signals are processed on said chain of hardware components and the resulting signal thereafter can further be used within an electronic circuit. Said method comprises the step of converting analog signals into a lower frequency digital signal. Said conversion step comprises the steps of capturing a plurality of incoming signals within a predetermined spectral range, filtering out of said incoming signals a first plurality of analog spread spectrum signals in a plurality of predetermined bands with predetermined bandwidths, and sampling said analog signals with a sampling frequency $f_s$ wherein $f_s$ is chosen such that the resulting time-discrete signal comprises a second plurality of analog spread spectrum signals, being said first plurality of analog spread spectrum signals which have been aliased without substantial self-aliasing.

The terms aliasing and self-aliasing in this patent text are to be understood as follows. A signal with a spectrum G(w), G(w) determining a spectral band with a width, that is sampled with a sampling frequency $f_s$ results in a spectrum Gs(w) that consists of repetitions of G(w). This method of sampling is called aliasing in case the method results in overlapping repetitions of the first spectrum of signals. Self-aliasing can occur in case the spectrum G(w) consists of a sum of a plurality of spectra, for instance the spectra G1(w) and G2(w), G1(w) and G2(w) determining each a spectral band with a width. Gs(w) is said to be self-aliased when the spectrum of the sampled signal Gs(w)=G1s(w)+G2s (w), consisting of overlapping repetitions of G(w), comprises aliased images of G1(w) and/or G2(w) that are overlapping with themselves.

A plurality of signals that are within a predetermined continuous frequency range are constituting a band of signals. The predetermined frequency range is defined to be between two frequency points. The bandwidth is the positive difference between the values of the two frequency points. Several more refined definitions of a bandwidth exist. A common way of designating a bandwidth is the definition of a 3 dB bandwidth. A band is then defined as the range of adjacent signals, adjacent in frequency, that are between two frequency signals and that are stronger than a predetermined amplitude. The bandwidth is then defined as the positive difference between the values of the two frequency points of which the signals are not weaker than 3 dB as compared to the predetermined amplitude.

The method for receiving and converting spread spectrum signals is executed on an apparatus. In a further aspect of the present invention, an apparatus for receiving spread spectrum signals substantially simultaneously in different frequency bands is disclosed. Said apparatus comprises means for capturing a plurality of incoming spread spectrum signals within a predetermined spectral range. These means can include one or more antenna's, one or more amplifiers, one or more filters, one or more multiplexers, one or more mixers and any other circuitry. Such chain of components selects, downconverts and conditions the incoming signals. The apparatus further comprises another chain of hardware components including a filter for filtering out of said incoming signals a first plurality of analog spread spectrum signals in one or more predetermined bands with predetermined bandwidths, and a sampling unit for sampling said analog signals with a sampling frequency $f_s$ wherein $f_s$ is chosen such that the resulting time-discrete signal comprises a second plurality of analog spread spectrum signals, being said first plurality of analog spread spectrum signals which have been aliased without substantial self-aliasing. The apparatus further comprises means for further processing the second plurality of analog signals. These means can include means for digitizing said resulting time-discrete signal whereby defining a third plurality of digitized spread spectrum signals, and means for filtering one digitized signal out of said third plurality of digitized signals.

The chain of hardware components can be implemented in one single silicon chip. The further processing of the second plurality of signals can be done by means of an electronic circuit. This circuit can be implemented on the same silicon chip. The different components of the circuit and of the chain of hardware components can also be configured on a printed circuit board or can be configured on a multi-chip-module substrate. For the purpose of teaching of the invention an example is described here below. The example is related to the specific class of receivers for position determination. In particular a combined GPS and GLONASS receiver is discussed. It is obvious that other ways of implementing the method of the present invention can be imagined by the person of skill in the art, the spirit and scope of the present invention being limited only by the terms of the appended claims.

EXAMPLE

As shown in FIG. 1, an embodiment of the combined GPS and GLONASS receiver according the present invention comprises a microprocessor (100), a digital correlation engine (101), an analog front-end (102) and an antenna (103).

The microprocessor (100) runs the application software and controls the complete receiver. Typical control functions are automatic gain control and the control of the digital correlation engine (101).

The digital correlation engine (101) comprises a number of channels which each track signals from a GPS or a GLONASS satellite. Both course acquisition codes and precision codes can be tracked. For each channel the correlation values between the incoming signal and the code are measured. The carrier frequency and the code phase are controlled by the application software. In addition to this basic functionality, the digital correlation engine contains features for multipath mitigation, calibration and fast acquisition.

The analog front-end (102) converts the RF signals, which are captured by the antenna (103) into a time-discrete digital signal that can be used by the digital correlation engine.

Figure 2:
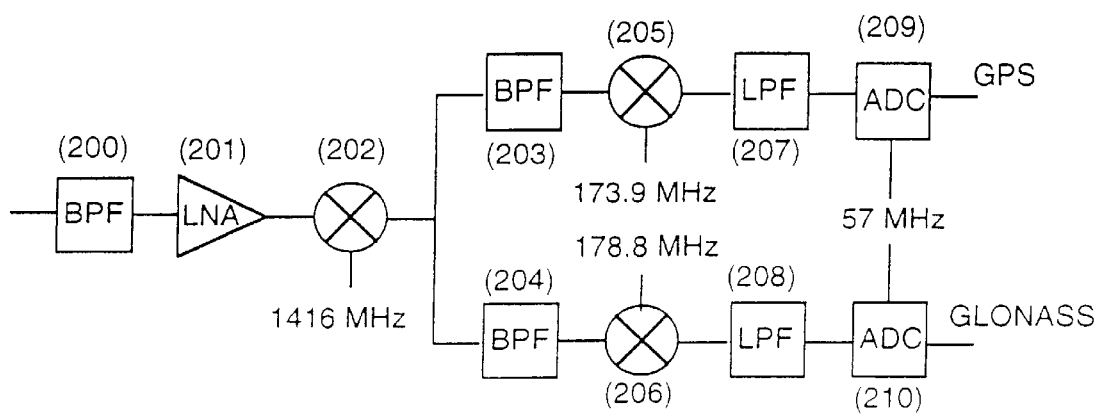
FIG. 2 shows the structure of a prior-art single frequency heterodyne front-end. BPF stands for Band Pass Filter, LNA for Low Noise Amplifier, ADC for Analog-to-Digital-Convertor and LPF for Low Pass Filter.

In a prior-art front-end architecture such as disclosed in JP7128423-950519 or in the paper "A combined GPS/GLONASS high precision receiver for space applications", ION-GPS 95, Palm Springs, USA, September 1995 by S. Riley, N. Howard, E. Aardoom, R. Daly, and P. Silvestrin, the GPS and GLONASS signals are separated on a different chain of hardware components. Such an architecture for a single-frequency receiver is shown in FIG. 2. First, a bandpass filter (200) suppresses out-of-band signals. A band at this stage is defined as a band that envelops both the GPS and GLONASS bands. The filtered signal is amplified (201) and mixed (202) with a frequency of 1416 MHz. This results in a first intermediate frequency signal. At this stage the GPS and GLONASS signals are separated by means of the bandpass filters (203) and (204). The resulting intermediate frequency GPS and GLONASS signals are further down-converted in the second mixing stage, comprising the mixers (205) and (206). Next the resulting GPS and GLONASS signals are filtered (207)(208) before being sampled and digitized by the analog to digital converters (209) and (210).

Because of the spread-spectrum nature of the GPS and GLONASS signals and the low cross-correlation between them, the front-end structure of the prior art can be largely simplified by aliasing the GPS and GLONASS signals according to an embodiment of the present invention.

Figure 3:
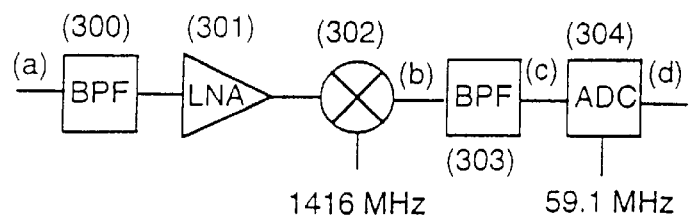
FIG. 3 shows the structure of an aliasing single frequency front-end according to an embodiment of the present invention. BPF stands for Band Pass Filter, LNA for Low Noise Amplifier, ADC for Analog-to-Digital-Convertor.

In FIG. 3, the structure of an aliased single-frequency front-end according to the present invention is shown. The bandpass filter (300), the low noise amplifier (301) and the mixer (302) are similar to the ones of FIG. 2. From this stage on however, the GPS and GLONASS signals are not separated on a different chain of hardware components, but they are further treated together. The bandpass filter (303) filters the combined GPS and GLONASS signal and the analog to digital converter (ADC) (304) samples this signal with a sampling frequency fs=59.1 MHz. The sampling frequency is provided as an input to the ADC (304). In the ADC this signal is also digitized.

Figure 4:
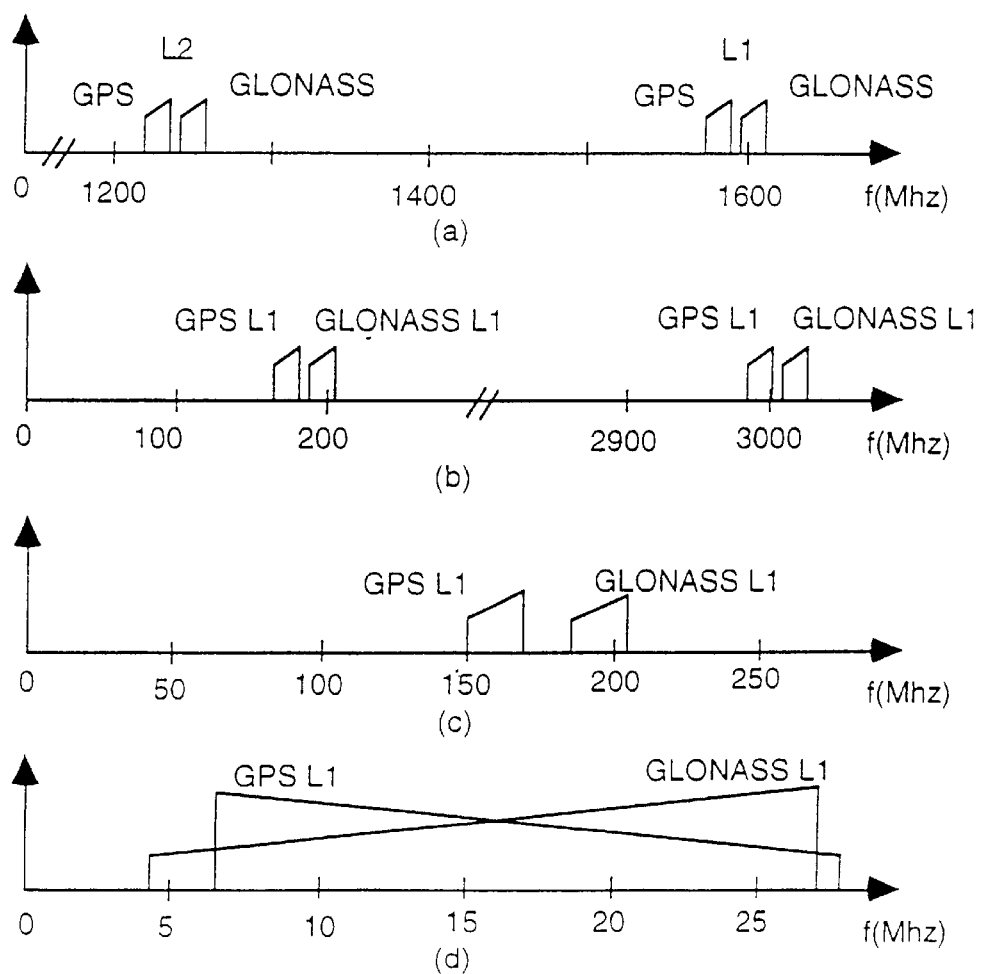
FIG. 4 shows the frequency spectrum of the different signals in the aliasing front-end according to an embodiment of the present invention.

The frequency spectrum of the signals at the different points in the aliased front-end are shown in FIG. 4. Thus a method and an apparatus is shown for receiving and converting GPS and GLONASS spread spectrum signals. Said method and said apparatus allow to receive spread spectrum signals in different frequency ranges substantially simultaneously on the same chain of hardware components. Said method comprises the step of converting analog signals ((a) in FIG. 4) into a lower frequency digital signal. Said conversion step comprises the steps of capturing a plurality of incoming signals within a predetermined spectral range ((b) in FIG. 4), filtering out of said incoming signals a first plurality of analog spread spectrum signals in a plurality of predetermined bands with predetermined widths ((c) in FIG. 4), and sampling said first plurality of analog signals with a sampling frequency $f_s$ wherein $f_s$ is chosen such that the resulting time-discrete signal comprises a second plurality of analog spread spectrum signals, being said first plurality of analog spread spectrum signals which have been aliased without substantial self-aliasing in the ADC (304). The resulting time-discrete signal thereafter is digitized thereby defining a third plurality of digitized spread spectrum signals ((d) in FIG. 4), and filtering one digitized signal out of said third plurality of digitized signals.

The sampling frequency fs can not be chosen arbitrarily. Two conditions must be met. First, to avoid self-aliasing (i.e. aliasing of one of the GPS or GLONASS bands with themselves), the minimum sampling frequency condition for each analog signal of the plurality of incoming GPS and GLONASS analog signals is fmin=(2*f1)/n with f1 being the lowest frequency of the analog signals of one band (the GPS or GLONASS band) and n=floor(f1/B), with B the predetermined bandwidth of the incoming analog signals (the bandwidth of the GPS or GLONASS band). The floor of a signal is its integer part e.g. floor(2.1)=2 and floor (3.9)=3. For the GPS signal shown in FIG. 4 f1=149.19 MHz and B=20.46 MHz. For the GLONASS signal shown in FIG. 4 f1=181.45 MHz and B=23.16 MHz. As a consequence, fmin=42.63 MHz for the GPS signal shown in FIG. 4 and fmin=51.84 MHz for the GLONASS signal shown in FIG. 4. However, taking as the minimum sampling frequency $f_s$ the value that is higher than or equal to both minimum sampling frequencies $f_{min}$, fs=51.84 MHz will cause self-aliasing of the GPS signals. To avoid this, a second condition must be met, that is: no harmonic of the sampling frequency should fall within the frequency band of either the GPS or GLONASS signals. The minimum frequencies that fulfil this extra condition lie between 58.5 MHz and 59.7 MHz. The sampling frequency in this particular example fs=59.1 MHz has been chosen in the middle of this interval. Remark that for this particular choice of the sampling frequency, an harmonic falls between the GPS and GLONASS bands. An alternative was to choose a sampling frequency with no harmonic in between the GPS and GLONASS frequency bands. This would result in a higher fs that lies between 68.2 MHz and 72.6 MHz.

As can be seen on FIG. 4(d), sampling at 59.1 MHz causes aliasing between the GPS and GLONASS signals: their frequencies overlap. Because the signals have a spread-spectrum nature and their codes have low cross-correlation values (the maximum cross correlation value between GPS and GLONASS coarse acquisition codes at zero Doppler difference is −18.5 db), the required signal can still be demodulated.

The aliased front-end of FIG. 3 requires as components in a particular embodiment only 1 mixer, 2 bandpass filters and 1 analog to digital converter. Compared to the 3 mixers, 5 bandpass filters and 2 analog to digital converters of the front-end in FIG. 2, this is less than half the number of components. However, the analog-to-digital converters for the aliased front-end have a higher bandwidth and hence should have a more stable clock and less sampling jitter.

The unique properties of the aliased front-end are due to the deliberate aliasing of the GPS and GLONASS signals. Also in other situations we could apply this principle. What follows is a non-exhaustive list of applications:

a) The GLONASS frequency bandwidth will be changed in the near future. The same technique is then still applicable, although with different values for the sampling frequency.

b) If only course acquisition codes should be tracked, the sampling frequencies could be lowered. Indeed, for the course acquisition GPS signal fmin=4.01 MHz and for the course acquisition GLONASS signal fmin=28.6 MHz. In combination with anti self-aliasing condition, the first interval of allowed sampling frequency fs is between 28.6 MHz and 31.0 MHz.

c) If both the signals on the L1 carrier and the L2 carrier are used by the receiver, a double-frequency front-end is needed. Such a front-end consists basically of two single-frequency front-ends.

d) The mixer (302) and bandpass filter (303) in FIG. 3 can be eliminated by directly sampling the RF signal.

e) The aliasing can also be used for other spread-spectrum signals than GPS or GLONASS. Especially when spread-spectrum is combined with frequency division, the technique is very advantageous.

We claim:

1. A method for converting analog signals into a lower frequency digital signal, comprising the steps of:

capturing a plurality of incoming spread spectrum signals within a predetermined spectral range;

filtering out of said incoming signals a first plurality of analog spread spectrum signals in a plurality of predetermined bands with predetermined bandwidths;

sampling said first plurality of analog signals with a sampling frequency $f_s$ wherein $f_s$ is chosen such that a resulting time-discrete signal comprises a second plurality of analog spread spectrum signals, being said first plurality of analog spread spectrum signals which have been aliased without self-aliasing.

2. The method as recited in claim 1 further comprising the steps of:

digitizing said resulting time-discrete signal thereby defining a third plurality of digitized spread spectrum signals; and filtering one digitized signal out of said third plurality of digitized signals.

3. The method as recited in claim 1 wherein $f_s$ is chosen to be the minimum sampling frequency such that the resulting time-discrete signal comprises a second plurality of analog spread spectrum signals, being said first plurality of analog spread spectrum signals which have been aliased without substantial self-aliasing.

4. The method as recited in claim 1 wherein $f_s$ is chosen as the sampling frequency such that the resulting time-discrete signal comprises a second plurality of analog spread spectrum signals, being said first plurality of analog spread spectrum signals which have been aliased without substantial self-aliasing, $f_s$ further being chosen such that the harmonic frequencies of $f_s$ are outside of said predetermined bands and such that $f_s$ is higher than or equal to a minimum sampling frequency $f_{min}$ for each of said predetermined bandwidths, $f_{min}$ being defined as $f_{min}=(2*f1)/n$ with f1 being the lowest frequency of the predetermined band and n=floor(f1/B), with B the bandwidth of said band.

5. The method as recited in claim 1 wherein said incoming signals comprise GPS and GLONASS signals and wherein said predetermined bandwidths comprise at least one bandwidth covering both adjacent GPS and GLONASS frequencies.

6. The method as recited in claim 1 wherein $f_s$ is chosen to be the minimum sampling frequency such that said analog signals have substantially no self-aliasing.

7. An apparatus for receiving substantially simultaneously spread spectrum signals in different frequency ranges, comprising:

means for capturing a plurality of incoming spread spectrum signals within a predetermined spectral range;

a filter for filtering out of said incoming signals a first plurality of analog spread spectrum signals in a plurality of predetermined bands with predetermined bandwidths; and a sampling unit for sampling said analog signals with a sampling frequency $f_s$ wherein $f_s$ is chosen such that the resulting time-discrete signal comprises a second plurality of analog spread spectrum signals, being said first plurality of analog spread spectrum signals which have been aliased without self-aliasing; and means for digitizing said resulting time-discrete signal thereby defining a third plurality of digitized spread spectrum signals.

8. The apparatus as recited in claim 7 wherein said means for capturing the incoming spread spectrum signals, said filter, said sampling unit, said means for digitizing and said means for filtering are configured as a chain of electronic hardware components.

9. The apparatus as recited in claim 8 wherein said chain of hardware components is integrated on a single silicon chip.

10. A method for converting analog signals into a lower frequency digital signal, comprising the steps of:

capturing a plurality of incoming spread spectrum signals within a predetermined spectral range;

filtering out of said incoming signals a first plurality of analog spread spectrum signals in a plurality of predetermined bands with predetermined bandwidths;

sampling said first plurality of analog signals with a sampling frequency $f_s$ wherein $f_s$ is chosen such that a resulting time-discrete signal comprises a second plurality of analog spread spectrum signals, being said first plurality of analog spread spectrum signals which have been aliased without self-aliasing, $f_s$ further being chosen such that the harmonic frequencies of $f_s$ are outside of said predetermined bands and such that $f_s$ is higher than or equal to a minimum sampling frequency $f_{min}$ for each said predetermined bandwidths, $f_{min}$ being defined as $f_{min}=(2*f1)/n$ with f1 being the lowest frequency of the predetermined band and n=floor (f1/B), with B the bandwidth of said band.

* * * * *